United States Patent [19]
Absil et al.

[11] Patent Number: 5,401,704
[45] Date of Patent: Mar. 28, 1995

[54] HYDROCRACKING CATALYST AND PROCESS USING SMALL CRYSTAL SIZE ZEOLITE Y

[75] Inventors: Robert P. L. Absil, West Deptford; James R. Katzer, Morrestown, both of N.J.; Daria N. Lissy, Glen Mills; Robert A. Ware, Wyndmoor, both of Pa.; Stephen S. Wong, Medford, N.J.

[73] Assignee: Mobil Oil Corp., Fairfax, Va.

[21] Appl. No.: 172,020

[22] Filed: Dec. 22, 1993

Related U.S. Application Data

[60] Continuation of Ser. No. 677,895, Apr. 1, 1991, abandoned, which is a division of Ser. No. 601,956, Oct. 23, 1990, abandoned.

[51] Int. Cl.[6] .......................... B01J 29/10; B01J 29/16
[52] U.S. Cl. .......................................... 502/66; 502/74
[58] Field of Search ................................... 502/66, 74

[56] References Cited

U.S. PATENT DOCUMENTS

| | | | |
|---|---|---|---|
| 3,516,786 | 6/1970 | Maber et al. | 23/113 |
| 3,864,282 | 2/1975 | Young | 252/455 |
| 5,073,530 | 12/1991 | Bezman et al. | 502/65 |

FOREIGN PATENT DOCUMENTS 0366207  5/1990  European Pat. Off.
WO90/13615 11/1990 WIPO.

*Primary Examiner*—Carl F. Dees
*Attorney, Agent, or Firm*—Alexander J. McKillop; Dennis P. Santini; Edward F. Kenehan, Jr.

[57] ABSTRACT

There is provided a process and a catalyst for hydrocracking hydrocarbons, such as gas oils. The catalyst comprises a hydrogenating metal and small crystal size zeolite Y. The zeolite Y may have a crystal size of less than one micron. Examples of hydrogenating metals include nickel and tungsten.

13 Claims, 8 Drawing Sheets

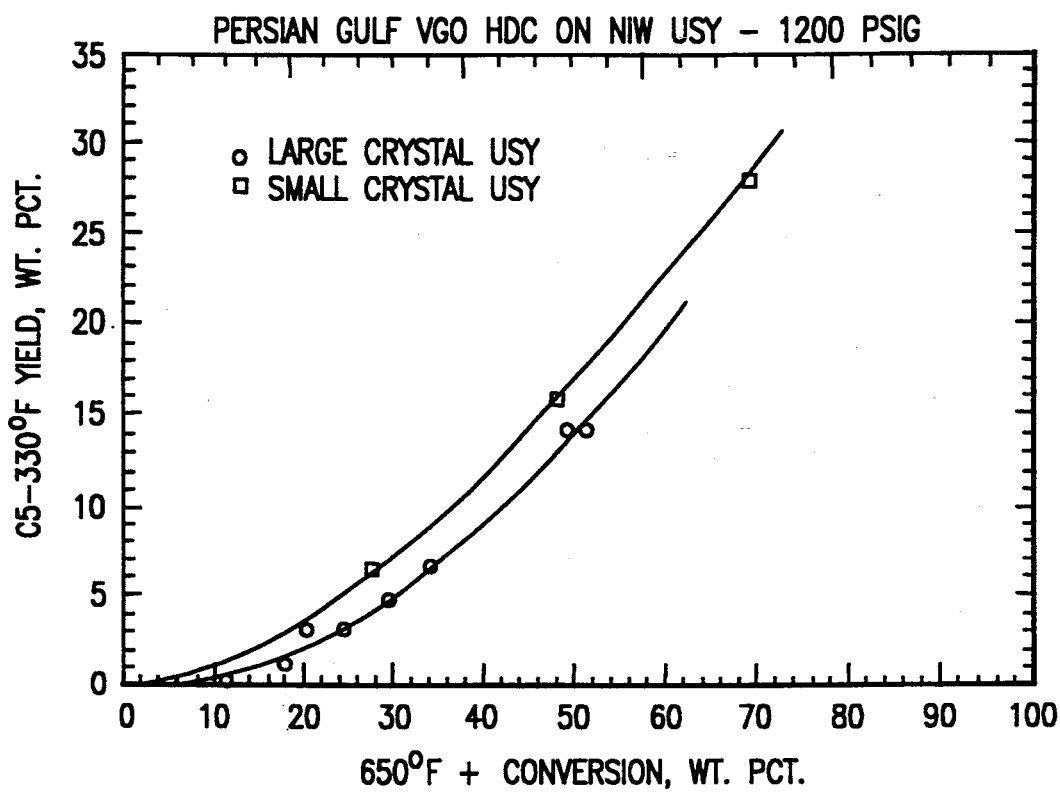
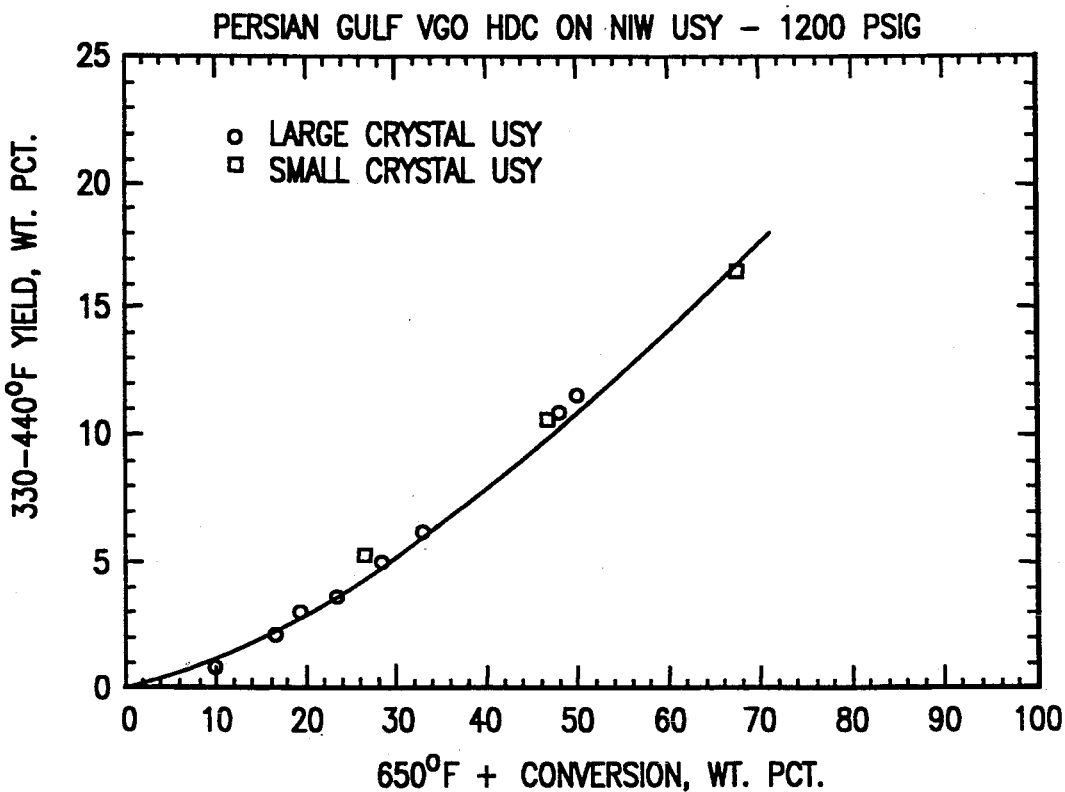

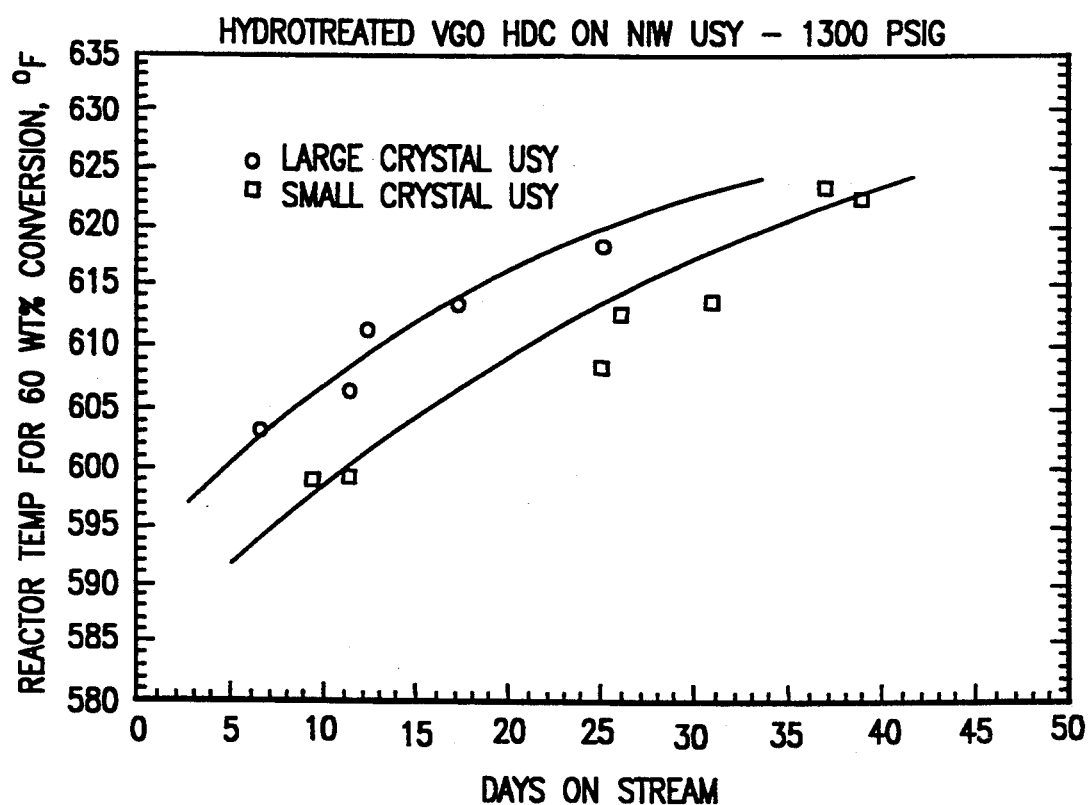

HYDROCRACKING CATALYST AND PROCESS USING SMALL CRYSTAL SIZE ZEOLITE Y

CROSS-REFERENCE TO RELATED APPLICATIONS

This application is a continuation of U.S. application Ser. No. 07/667,895, filed Apr. 1, 1991, now abandoned, which is a divison of U.S. application Ser. No. 07/601,956, filed Oct. 23, 1990, now abandoned.

BACKGROUND

This application relates to a catalyst and a process for hydrocracking hydrocarbons, such as gas oils. The catalyst comprises a hydrogenating metal and small crystal size zeolite Y.

Hydrocracking is a versatile petroleum refining process which enjoys widespread use in the refining industry. Hydrocracking has the ability to process a wide range of difficult feedstocks into a variety of desirable products. Feedstocks which may be treated by this process include heavy naphthas, kerosenes, refractory catalytically cracked cycle stocks and high boiling virgin and coker gas oils. At high severities, hydrocracking can convert these materials to gasoline and lower boiling paraffins; lesser severities permit the higher boiling feedstocks to be converted into lighter distillates such as diesel fuels and aviation kerosenes.

Hydrocracking is conventionally carried out at moderate temperatures of 350° C. to 450° C. (650° F. to 850° F.) and at high pressures, over 7,000 kPa (1,000 psig) because the thermodynamics of the hydrocracking process become unfavorable at higher temperatures. In addition, high hydrogen pressures, usually at least 800 psig are usually required to prevent catalyst aging and so to maintain sufficient activity to enable the process to be operated with a fixed bed of catalyst for periods of one to two years without the need for regeneration.

The catalysts used for hydrocracking usually comprise a transition metal such as nickel, cobalt, tungsten or molybdenum on an acidic support such as alumina or silica-alumina although noble metals such as platinum may also be used. Combinations of metals such as nickel with tungsten have been found to be extremely effective with a wide variety of feedstocks as has the presulfiding technique which is now widely employed.

Hydrocracking processes using the hydrogen form of zeolite Y as the acidic component are described, for example, in U.S. Pat. Nos. 3,269,934 and 3,524,809, and in "Preparation of Catalysts III", G. Poncelet, P. Grange and P. A. Jacobs, Editors, Elsevier Science Publishers (1983), p. 587.

SUMMARY

In accordance with embodiments described herein, there is provided a process for hydrocracking hydrocarbons, said process comprising contacting a petroleum refinery fraction with a catalyst and hydrogen under sufficient hydrocracking conditions, said catalyst comprising one or more hydrogenating metals and zeolite Y, the crystal size of said zeolite Y being less than 1.0 micron. Advantages of the use of such small crystal size zeolite Y include greater naphtha yields, and greater activity with little or no increase in gas make. For the purposes of the present application it will be understood that naphtha includes hydrocarbons having a boiling range of from about 36° C. (97° F.) to about 165° C. (330° F.).

The small crystal size zeolite Y catalyst is also found to produce a higher quality kerosine and distillate product from feedstocks of widely different composition.

There is also provided herein a catalyst comprising zeolite Y and a combination of hydrogenating metals, wherein said zeolite Y has a crystal size of less than 1.0 micron.

BRIEF DESCRIPTION OF THE DRAWINGS

FIGS. 1–15 are graphs showing advantages of using small crystal size zeolite Y in hydrocracking reactions.

EMBODIMENTS

Figure 1:
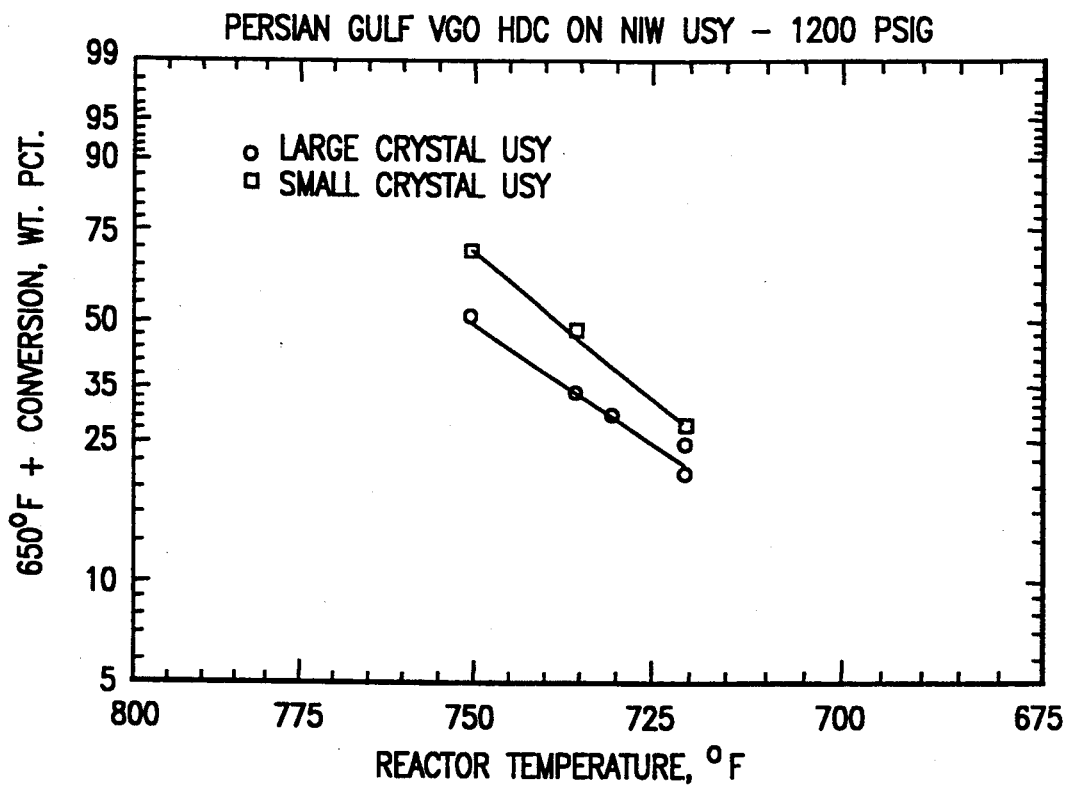

The present process may be used for hydrocracking a variety of feedstocks such as crude petroleum, reduced crudes, vacuum tower residua, coker gas oils, cycle oils, FCC tower bottoms, vacuum gas oils, deasphalted residua and other heavy oils. These feedstocks may optionally be subjected to a hydrotreating treatment prior to being subjected to the present hydrocracking process. The feedstock, especially in the non-hydrotreated form, will contain a substantial amount boiling above 260° C. (500° F.) and will normally have an initial boiling point of about 290° C. (about 550° F.) more usually about 340° C. (650° F.). Typical boiling ranges will be about 340° C. to 565° C. (650° F. to 1050° F.) or about 340° C. to 510° C. (650° F. to 950° F.) but oils with a narrower boiling range may, of course, also be processed, for example, those with a boiling range of about 340° C. to 455° C. (650° F. to 850° F.). Heavy gas oils are often of this kind as are cycle oils and other non-residual materials. Oils derived from coal, shale or tar sands may also be treated in this way. It is possible to co-process materials boiling below 260° C. (500° F.) but they will be substantially unconverted. Feedstocks containing lighter ends of this kind will normally have an initial boiling point above 150° C. (about 300° F.). Feedstock components boiling in the range of 290° to 340° C. (about 550° to 650° F.) can be converted to products boiling from 230° C. to 290° C. (about 450° to 550° F.) but the heavier ends of the feedstock are converted preferentially to the more volatile components and therefore the lighter ends may remain unconverted unless the process severity is increased sufficiently to convert the entire range of components. A particular hydrocarbon feedstock which may be used is an FCC recycle oil having an initial boiling point of at least about 343° C. (650° F.). Other examples of feedstocks include those with relatively large contents of non-aromatic hydrocarbons, such as paraffinic feedstocks, e.g., feedstocks having at least 20 percent by weight, e.g., at least 50 percent by weight, e.g., at least 60 percent by weight, of paraffins. Feedstocks, including those which have been hydrotreated, which may be used in the present process, include those having at least 70 wt. % of hydrocarbons having a boiling point of at least 204° C. (400° F.).

Methods for preparing zeolite Y are well known. Small crystal size Y may be prepared by known methods including, for example, those methods described in U.S. Pat. Nos. 3,864,282 and 3,516,786, the entire disclosures of which are expressly incorporated herein by reference.

Zeolite Y is normally synthesized in forms having silica:alumina ratios up to about 5:1. These as-synthesized forms of zeolite Y may be subjected to various treatments to remove structural aluminum therefrom. Many of these techniques rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the method: Catalysis by Zeolites ((International Symposium on Zeolites, Lyon, Sept. 9–11, 1980), Elsevier Scientific Publishing Co., Amsterdam, 1980 (dealuminization of zeolite Y with silicon tetrachloride); U.S. Pat. No. 3,442,795 and G.B. No. 1,058,188 (hydrolysis and removal of aluminum by chelation); G.B. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-contrary gases at high temperatures), NL No. 7,604,264 (acid extraction), JA No. 53,101,003 (treatment with EDTA or other materials to remove aluminum) and J. Catalysis 54 295 (1978) (hydrothermal treatment followed by acid extraction).

Highly siliceous forms of zeolite Y may be prepared by steaming or by acid extraction of structural aluminum (or both) but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and reference is made to these for details of the zeolite and in preparation. In general, "ultrastable" refers to Y-type zeolite which is highly resistant to degradation of crystallinity by high temperature and steam treatment and is characterized by a $R_2O$ content (wherein R is Na, K or any other akali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite.

Other methods for increasing the silica:alumina ratio of zeolite Y by acid extraction are described in U.S. Pat. Nos. 4,218,307; 3,591,488 and 3,691,099 to which reference is made for details of these methods.

A preferred method of preparing highly siliceous forms of zeolite Y by acid extraction of the stabilized zeolite is described in U.S. patent application Ser. No. 379,424, filed May 8, 1982 now abandoned, by R. B. LaPierre, R. D. Partridge and P. T. Reischmann and entitled "Method for Preparing Acid Stable Zeolites and High Silica Zeolites Prepared By It", and reference is made to that application for details of the method.

In addition to the above-mentioned USY form of zeolite Y, other known forms of zeolite Y, including the rare earth exchanged Y form (REY), may be used in the present process.

The zeolite Y used in the present process may have a unit cell size (UCS) of, for example, 24.5 Angstroms or less, e.g., 24.50–24.15 Angstroms, e.g., 24.20–24.40 Angstroms, e.g., from 24.40–24.30 Angstroms. Such zeolites having a low UCS, e.g., of 24.15–24.30 Angstroms, may be particularly advantageous.

The catalyst used in the present process comprises a hydrogenation metal which may be a noble metal or metals or a non-noble metal or metals. Suitable noble metals include platinum, palladium, and other members of the platinum group such as iridium and rhodium. Suitable non-noble metals include those of Groups VA, VIA and VIIIA of the Periodic Table. The Periodic Table used in this specification is the table approved by IUPAC and the U.S. National Bureau of Standards, as shown for instance in the table of the Fisher Scientific Company, Catalog No, 5-702-10. Preferred non-noble metals are chromium, molybdenum, tungsten, cobalt and nickel and combinations of these metals such as cobalt-molybdenum, nickel-molybdenum, nickel-tungsten and cobalt-nickel-tungsten. Non-noble metal components may be pre-sulfided prior to use by exposure to a sulfur-containing gas such as hydrogen sulfide at an elevated temperature to convert the oxide form to the corresponding sulfide form of the metal.

The metal may be incorporated into the catalyst by any suitable method such as impregnation or exchange onto the zeolite. The metal may be incorporated in the form of a cationic, anionic or neutral complex such as $Pt(NH_3)_4^{2+}$ and cationic complexes of this type will be found convenient for exchanging metals onto the zeolite. Anionic complexes such as the molybdate or metatungstate ions are useful for impregnating metals into the catalysts.

The amount of the hydrogenation metal is suitably from 0.01 to 20 percent by weight, normally 0.1 to 15 percent by weight based on the weight of the zeolite Y and matrix plus the weight of the hydrogenation metal, although this will, of course, vary with the nature of the component, less of the highly active noble metals, particularly platinum, being required than of the less active base metals.

It may be desirable to incorporate the catalyst in another material resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calcination, acid treatment or chemical modification.

The catalyst may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely with the zeolite content ranging from between 1 to 99, more usually 5 to 80, percent by weight of the composite. The matrix may itself possess catalytic properties generally of an acidic nature.

The hydrocracking process can be carried out at temperatures ranging from about 250° C. (480° F.) to about 500° C. (930° F.), e.g., from about 300° C. (570° F.) to about 450° C. (840° F.); hydrogen pressures ranging from about 2 to 21 MPa, e.g., from about 3 to 21 MPa; liquid hourly space velocities ranging from about 0.05 to about 10, e.g., from about 0.2 to 3; $H_2$ circulations ranging from about 500 to about 10,000 scfb, e.g., from about 2000 to about 6000 scfb.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity.

A preliminary hydrotreating step to remove nitrogen and sulfur and to saturate aromatics to naphthenes without substantial boiling range conversion will usually improve catalyst performance and permit lower temperatures, higher space velocities, lower pressures or combinations of these conditions to be employed.

EXAMPLE 1

This Example describes the preparation of the small crystal USY catalyst. The small crystal USY catalyst was prepared by admixing small crystal USY zeolite (PQ) and alpha alumina monohydrate (Kaiser SA). On a bone dry basis, the mix contained 50% small crystal USY and 50% alumina. The resulting mix was transformed into an extrudable paste by mulling and adding deionized (DI) water. The resulting paste was extruded to yield 1/16" diameter extrudate which were dried at 250° F. (121° C.) and subsequently calcined at 1000° F. (538° C.) for 3 hours in flowing air. To effect removal of zeolitic sodium, the catalyst was ammonium exchanged for 1 hour at room temperature with 5 ml of 1N $NH_4NO_3$ solution per gram of catalyst and, subsequently, dried at 250° F. (121° C.) and calcined at 1000° F. (538° C.) for 3 hours in flowing air. The catalyst was then steamed at 1000° F. (538° C.) for 10 hours in 100% steam. To effect further removal of zeolitic sodium, the steamed catalyst was ammonium exchanged for 1 hour at room temperature with 5 ml of 1N $NH_4NO_3$ solution per gram of catalyst and, subsequently, dried at 250° F. (121° C.) and calcined at 1000° F. (538° C.) for 3 hour in flowing air. The catalyst was then impregnated with an ammonium metatungstate solution, dried at 250° F. (121° C.) and calcined at 1000° F. (538° C.) for 2 hours in flowing air. The catalyst was subsequently impregnated with a nickel nitrate hexahydrate solution, dried at 250° F. (121° C.) and calcined at 1000° F. (538° C.) for 2 hours in flowing air. The physical and chemical properties of this finished catalyst are detailed in Table 1.

EXAMPLE 2

This Example describes the preparation of the large crystal USY catalyst. The large crystal USY catalyst was prepared by admixing large crystal USY zeolite (Davison Z-14) and alpha alumina monohydrate (Kaiser SA). On a bone dry basis, the mix contained 50% large crystal USY and 50% alumina. The resulting mix was transformed into an extrudable paste by mulling and adding DI water. The resulting paste was then extruded to yield 1/16' diameter extrudate which were dried at 250° F. (121° C.) and subsequently calcined at 1000° F. (538° C.) for 3 hours in flowing air. To effect removal of zeolitic sodium, the catalyst was ammonium exchanged for 1 hour at room temperature with 5 ml of 1N $NH_4NO_3$ solution per gram of catalyst and, subsequently, dried at 250° F. (121° C.) and calcined at 1000° F. (538° C.) for 3 hours in flowing air. This procedure was repeated two more times to effectively remove zeolitic sodium. The resulting catalyst was then steamed at 950° F. (510° C.) for 10 hours in 100% steam. The steamed catalyst was impregnated with ammonium metatungstate and nickel nitrate hexahydrate solutions using substantially the same procedures as detailed in Example 1. The physical and chemical properties of this finished catalyst are detailed in Table 1.

The catalyst preparation procedures were chosen so as to obtain USY catalysts which had substantially equivalent alpha activities (40 vs 50) and unit cell sizes (24.36 vs 24.33 A) prior to metals impregnation (cf. Table 1).

TABLE 1

| | Catalyst Properties | | |
|---|---|---|---|
| | Hydrotreating | Small Crystal Hydrocracking | Large Crystal Hydrocracking |
| Physical Properties | | | |
| Zeolite, wt % | | 50[1] | 50[1] |
| Zeolite size, um | | 0.2–0.4 | 1–2 |
| Zeolite UCS, A | | 24.36 | 24.33 |
| Alpha | | 40[1] | 50[1] |
| Surface area, m²/g | 138 | 245 | 240 |
| Pore volume, cc/g | 0.39 | 0.60 | 0.65 |
| Ave. pore diam., A | 113 | 98 | 107 |
| Packed density, g/cc | 0.88 | 0.66 | 0.62 |
| Chemical Composition | | | |
| Nickel, wt % | 3.9 | 4.0 | 3.7 |
| Molybdenum | 13.7 | | |
| Tunsgten | | 15.0 | 13.5 |
| Sodium, ppm | | 705 | 370 |

[1]Extrudate is 50/50 wt/wt USY/alumina mixture prior to metals addition.

EXAMPLE 3

This Example illustrates the activity advantage of hydrocracking a Persian Gulf vacuum gas oil (VGO) over a hydrocracking catalyst comprised of small crystal USY prepared in Example 1 compared to a similar catalyst containing large crystal USY prepared in Example 2.

The experiments were carried out in a fixed-bed pilot unit employing a commercial NiMo/Al$_2$O$_3$ hydrotreating (HDT) catalyst and the small or large crystal NiW USY hydrocracking (HDC) catalyst. Physical and chemical properties of these HDT and HDC catalysts are detailed in Table 1.

The pilot unit was operated by cascading effluent from the HDT stage to the HDC stage directly without removal of ammonia, hydrogen sulfide, and light hydrocarbon gases at the interstage. The conditions employed for the experiments included temperatures from 715°–765° F. (about 380°–410° C.), 0.5 LHSV (based on fresh feed relative to total HDT and HDC catalyst), 4000 scf/bbl (712 n.l.l$^{-1}$) of once-through hydrogen circulation, and hydrogen inlet pressure from 815 to 1515 psia (5.61–10.44 MPa). The ratio of HDT to HDC catalyst was typically ½, vol/vol.

The feedstock for this example was a nominal 650°–1050° F. (about 345°–565° C.) Persian Gulf vacuum gas oil (VGO) having the properties shown in Table 2 below.

TABLE 2
Persian Gulf VGO Feedstock Properties

| General Properties | |
|---|---|
| API Gravity | 22.0 |
| Hydrogen, wt % | 12.53 |
| Sulfur, wt % | 2.53 |
| Nitrogen, ppm | 780 |
| Pour point, °F. | 100 |
| KV @ 40° C., cSt. | 74.34 |
| KV @ 100° C., cSt. | 7.122 |
| Composition, wt % | |
| Paraffins | 24.1 |
| Naphthenes | 22.1 |
| Aromatics | 53.8 |
| Distillation, °F. | (D2887) |
| IBP | 546 |
| 5% | 627 |
| 10% | 664 |
| 30% | 760 |
| 50% | 831 |
| 70% | 906 |
| 90% | 1003 |
| 95% | 1041 |
| EP | 1158 |

FIG. 1 shows the activity for 650° F. (343° C.) boiling range conversion at 1215 psia hydrogen of the Persian Gulf VGO over the HDT/HDC catalyst systems comprised of small crystal and large crystal USY zeolite. During the experiment, the HDT and HDC catalysts were both maintained at the same temperature which was adjusted simultaneously to achieve different levels of conversion. The results shown in FIG. 1 demonstrate the higher activity of the small crystal USY catalyst system.

EXAMPLES 4 & 5

Figure 2:
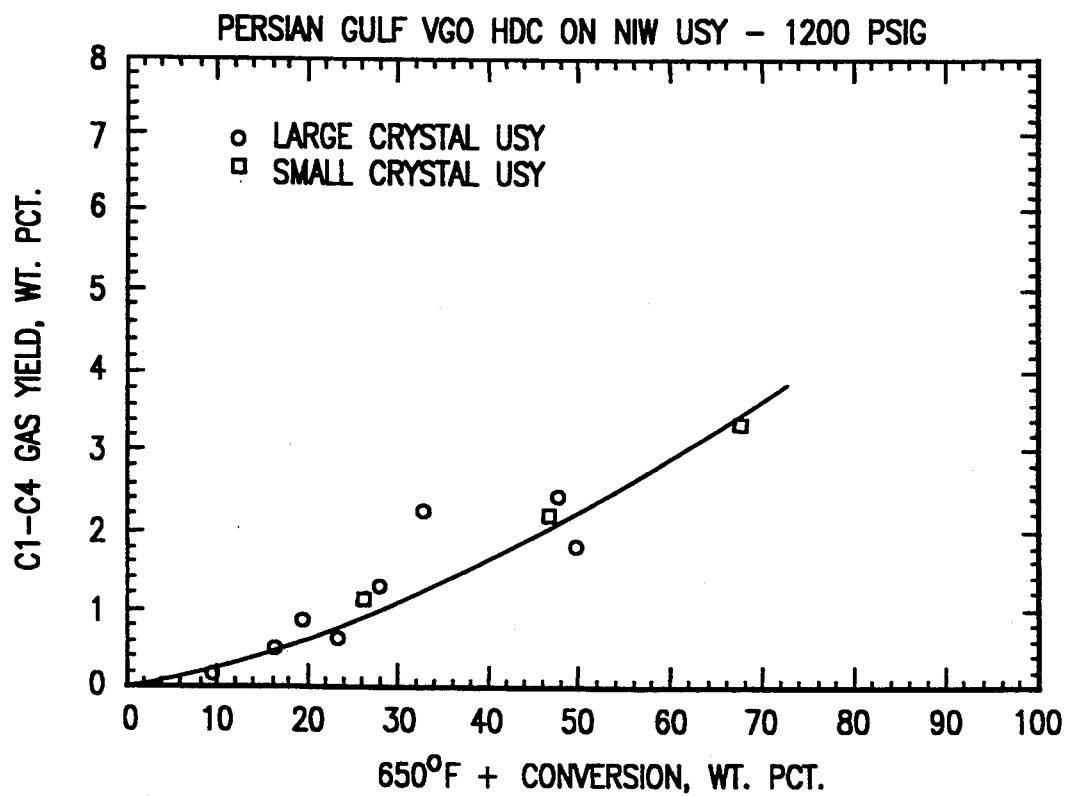
Figure 5:
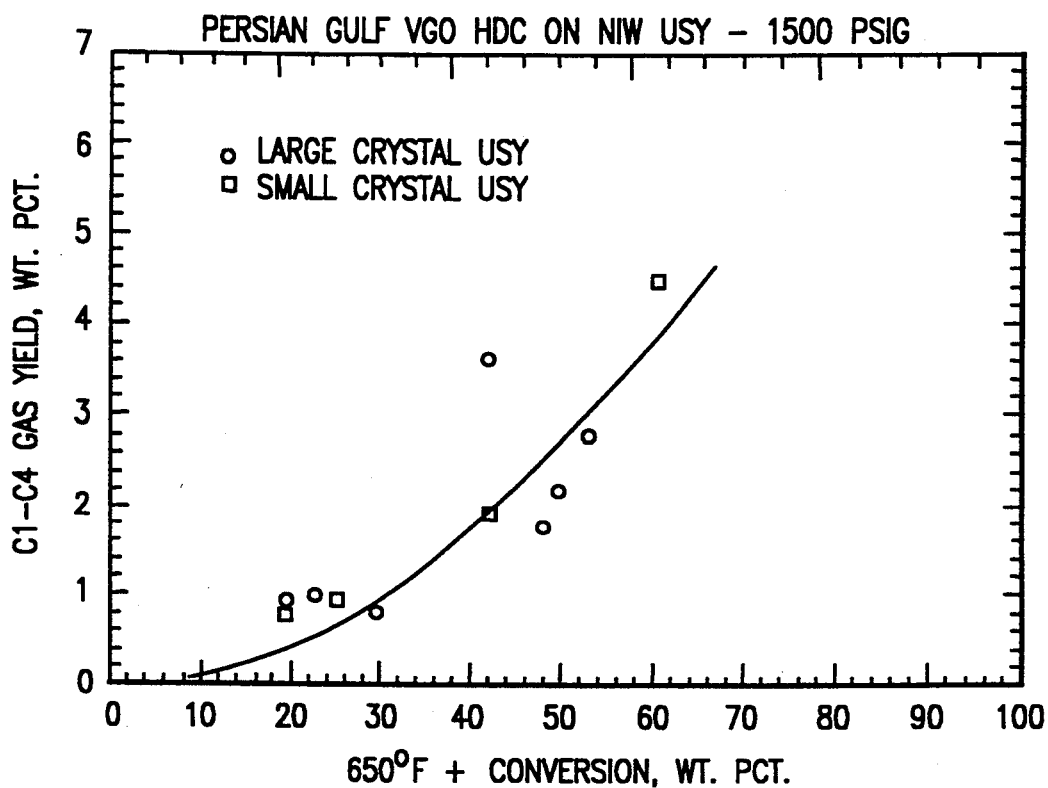
Figure 6:
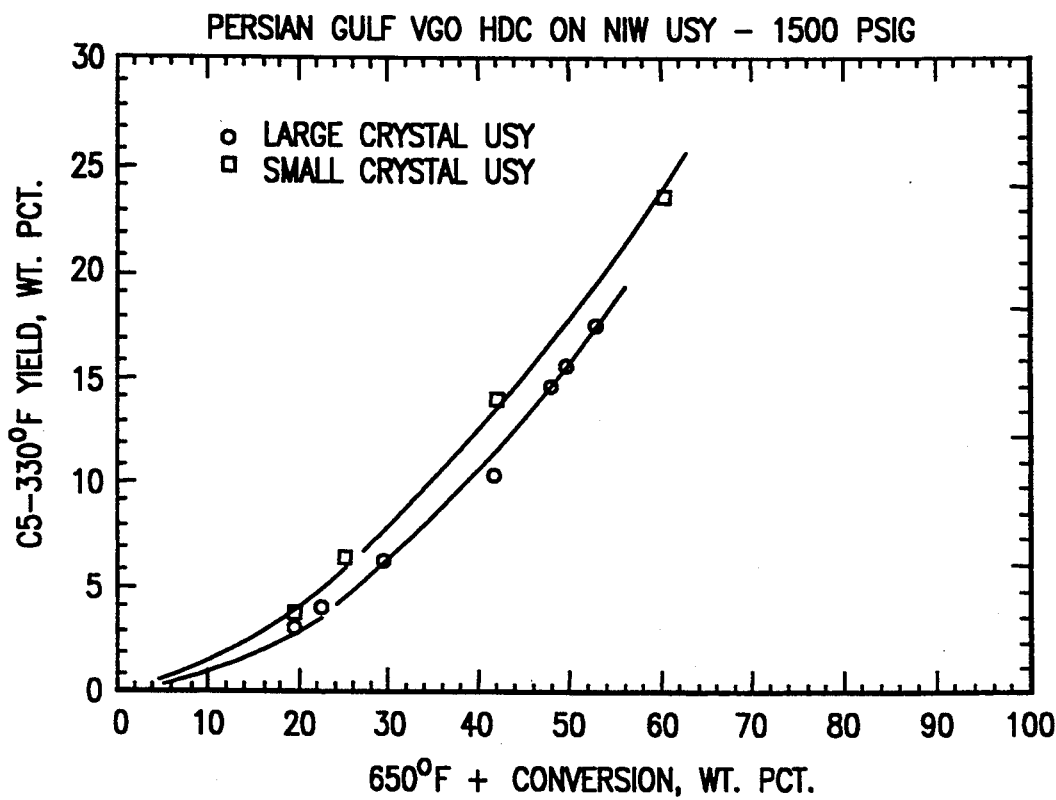
Figure 7:
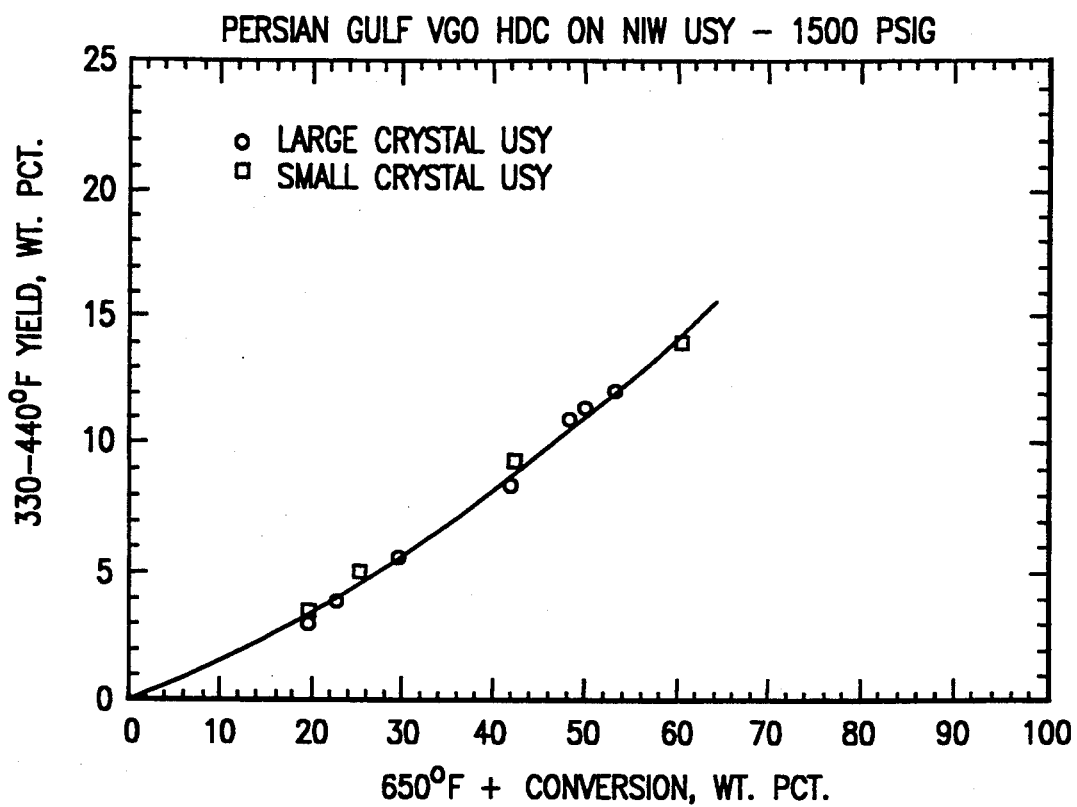

These Examples illustrate the yield results for light boiling range products for the small and large crystal USY HDC systems described in Examples 1 & 2. The feedstock and unit operation was the same as that described in Example 3. The results, as shown in FIGS. 2 to 4 at 1215 psia hydrogen, the FIGS. 5 to 7 at 1515 psia hydrogen pressure, show equivalent C$_1$–C$_4$ gas yield and 330°–440° F. (165°–227° C.) kerosine yield but higher C$_5$-330° F. (C$_5$-165° C.) naphtha yield for the smaller crystal USY catalyst as a function of feedstock boiling conversion. The higher C$_5$-330° F. naphtha yield at equivalent C$_1$–C$_4$ light gas yield is unexpected as higher naphtha yields are usually accompanied by higher light gas yields in hydrocracking.

EXAMPLE 6

Example 6 demonstrates the improved naphtha yield at constant kerosine yield for the small crystal USY HDC catalyst when hydrocracking a waxy South East Asian VGO. The feedstock properties are listed below in Table 3 and the experiments were conducted as described in Example 3 with the exception that the hydrogen pressure was lowered to 815 psia.

TABLE 3
South East Asian VGO Feedstock Properties

| General Properties | |
|---|---|
| API Gravity | 31.9 |
| Hydrogen, wt % | 13.98 |
| Sulfur, wt % | 0.10 |
| Nitrogen, ppm | 400 |
| Pour point, °F. | 115 |
| KV @ 100° C., cSt. | 4.178 |
| Composition, wt % | |
| Paraffins | 56.5 |
| Naphthenes | 24.1 |
| Aromatics | 19.4 |
| Distillation, °F. | (D2887) |
| IBP | 457 |
| 5% | 567 |
| 10% | 617 |
| 30% | 726 |
| 50% | 787 |
| 70% | 837 |
| 90% | 907 |
| 95% | 931 |
| EP | 1011 |

Figure 8:
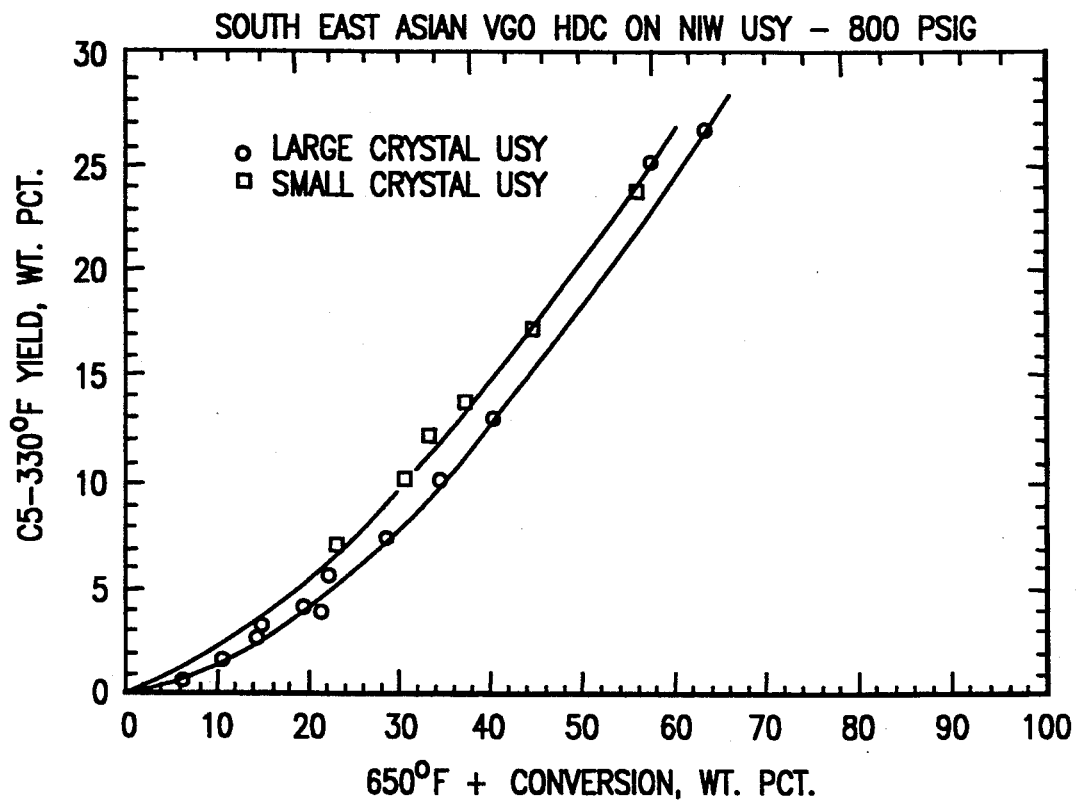
Figure 9:
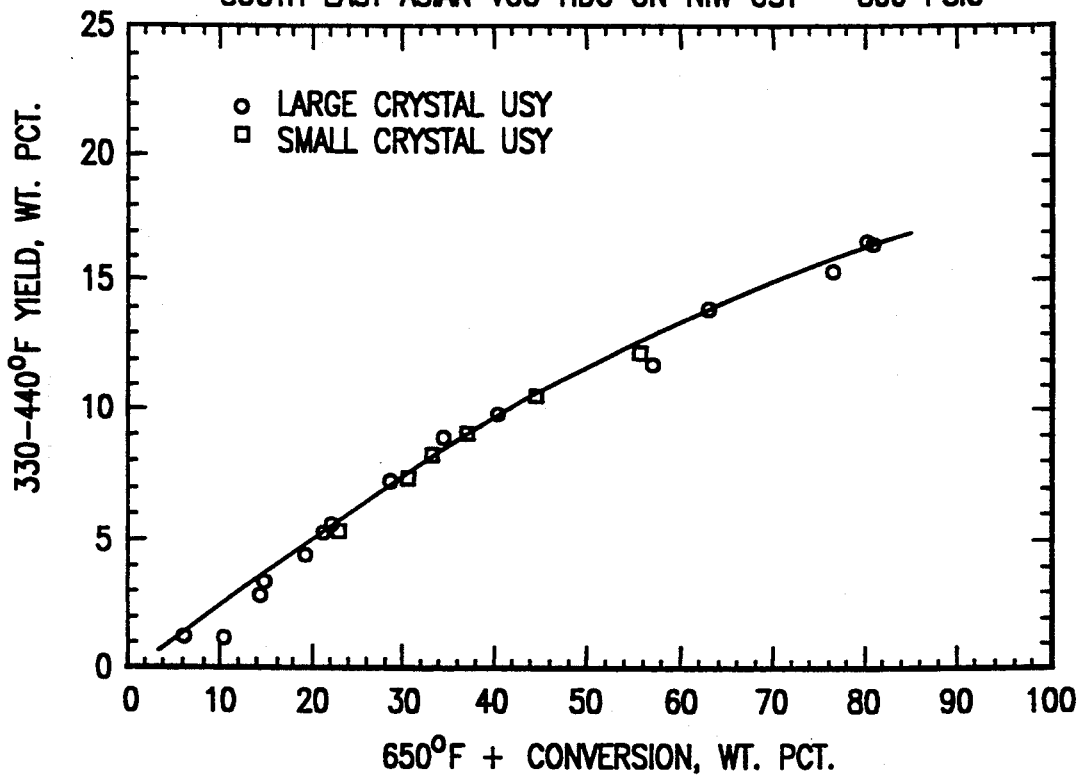

The results, presented in FIGS. 8 & 9 show higher C$_5$-330° F. (C$_5$-165° C.) naphtha yield at equivalent 330°–440° F. (165°–227° C.) kerosine yield for the smaller crystal USY catalyst as a function of feedstock boiling conversion.

EXAMPLE 7

Figure 10:
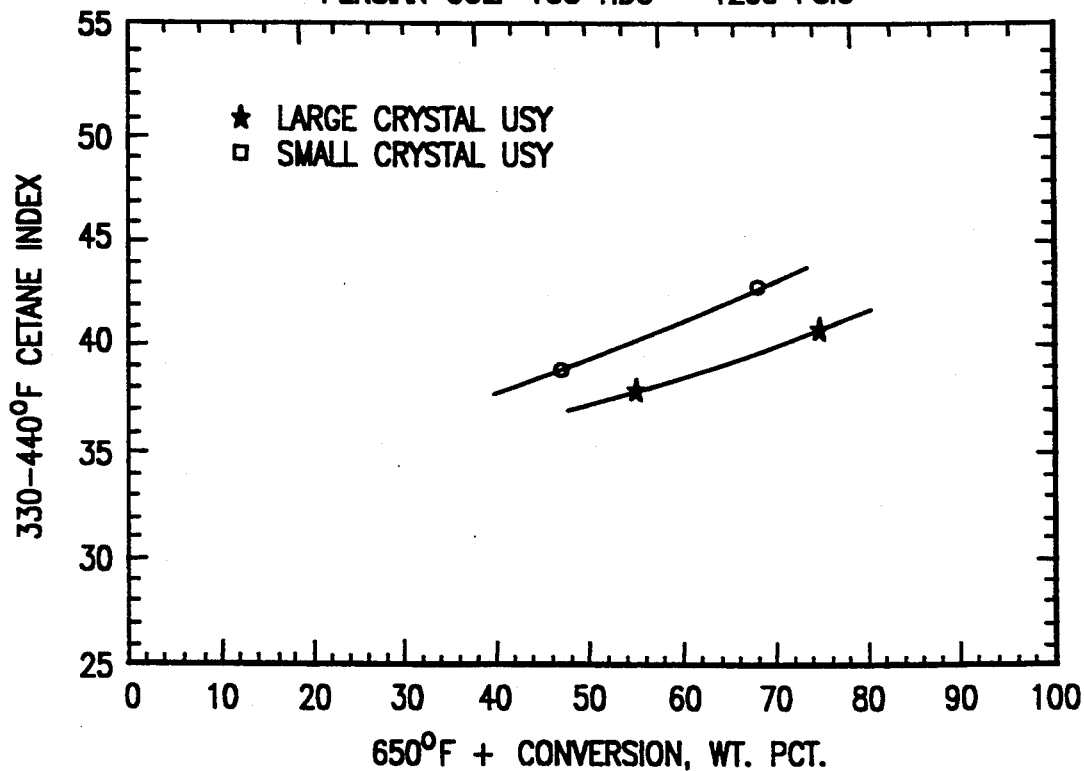
Figure 11:
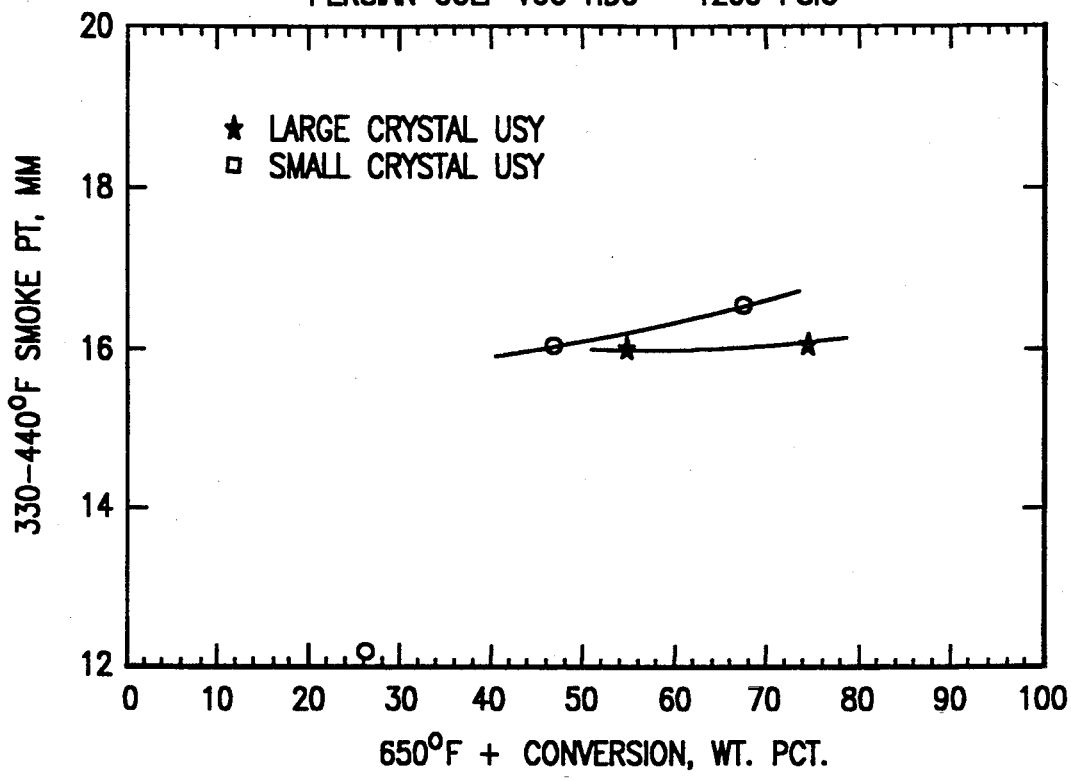

The Persian Gulf VGO described in Table 2 was hydrocracked at 1215 psia hydrogen pressure over the small and large crystal USY catalyst systems described in Examples 1 & 2 and boiling range conversion was varied by adjusting the reaction temperature. The products from these experiments were distilled to yield a 330°–440° F. (165°–227° C.) kerosine fraction. The properties of the kerosine as a function of 650° F.+ (343° C.+) boiling range conversion are shown in FIGS. 10 & 11. These results show an unexpected improvement in kerosine quality for the small crystal USY catalyst as measured by Cetane Index (API Gravity × Aniline Point/100) and Smoke Point. This improved kerosine quality is obtained without loss in yield as shown in Example 4, FIG. 4.

EXAMPLES 8 & 9

Figure 12:
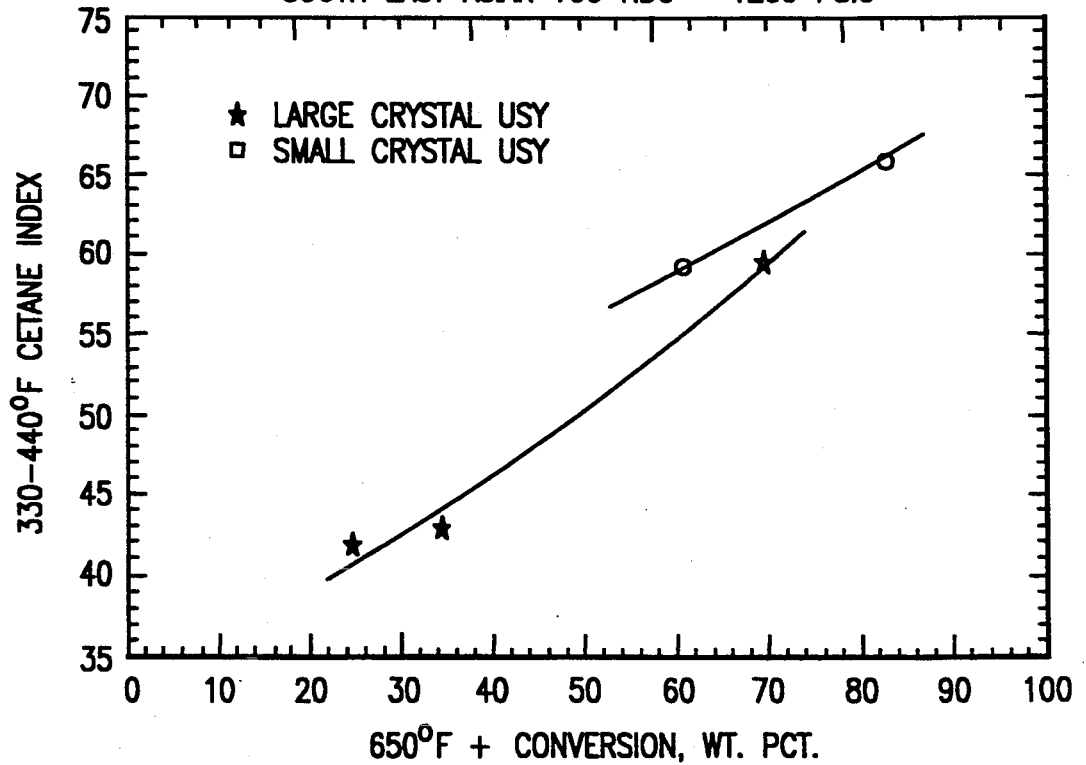
Figure 13:
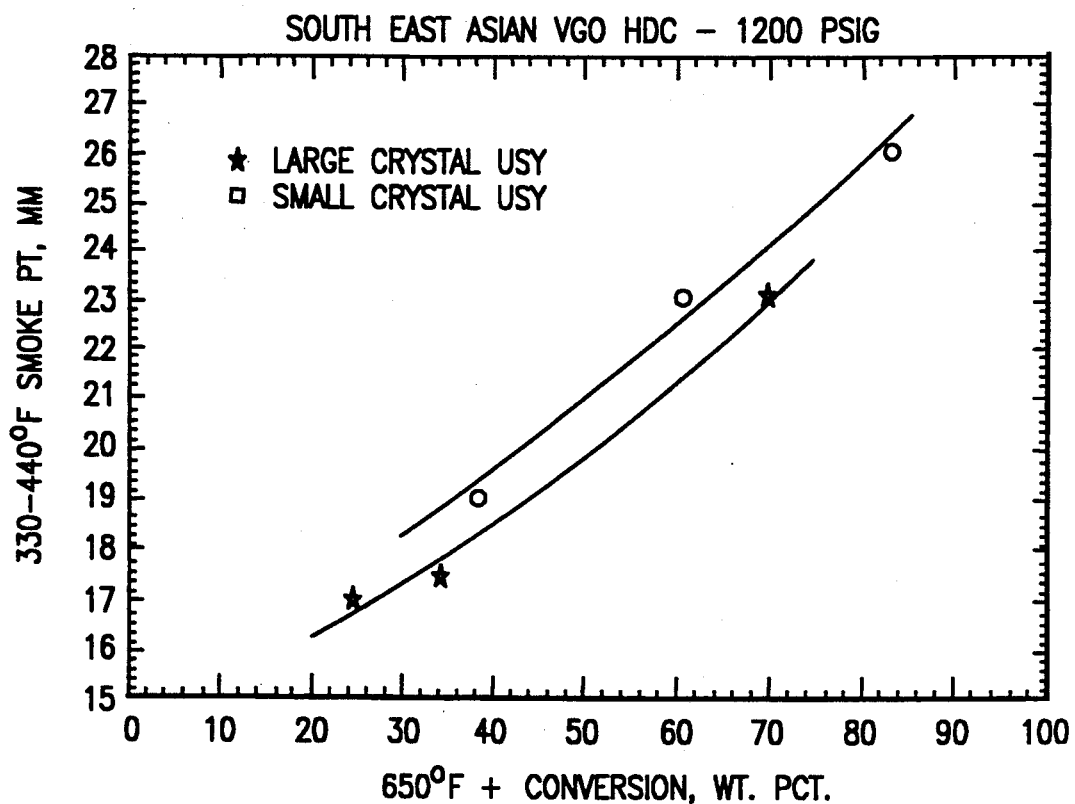
Figure 14:
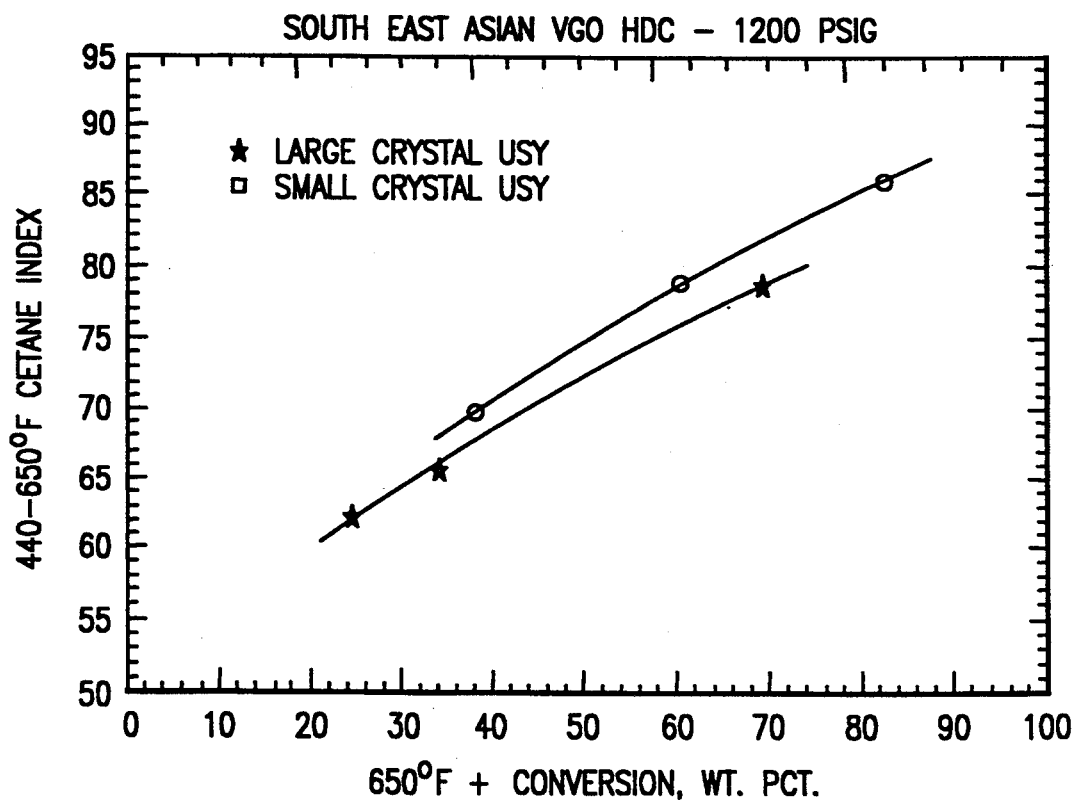

The waxy South East Asian VGO described in Table 3 was hydrocracked at 1215 psia over the small and large crystal USY catalyst systems described in Examples 1 & 2 and boiling range conversion was varied as described in Example 7. Total liquid product from the reaction was distilled to yield a 330°–440° F. (165°–227° C.) kerosine and a 440°–650° F. (227°–343° C.) distillate fraction. The properties of the kerosine as a function of 650° F.+ (343° C.+) boiling range conversion are shown in FIGS. 12 & 13. These results show an unexpected improvement in kerosine Cetane Index and Smoke Point for the small crystal USY catalyst relative to the large crystal USY catalyst. The distillate Cetane Index plotted in FIG. 14 shows a similar improvement in quality for the small crystal USY catalyst at equivalent boiling range conversion.

EXAMPLE 10

Catalyst A, containing large crystal USY (Zeochem) is prepared by dry mixing the USY zeolite and amorphous silica-alumina in proportions to give, after calcination, 50% USY/50% silica-alumina in the matrix. A solution of nickel nitrate and ammonium metatungstate is added to the mix to create an extrudable mull, and the mix is formed into an extrudate of the desired diameter on a California pellet mill. The extrudate is dried at 250° F. (121° C.) and calcined in air at 1000° F. (538° C.). Physical and chemical properties of this catalyst are give in Table 4.

EXAMPLE 11

Catalyst B is prepared in the same manner as the catalyst in Example 10 except that a small crystal USY (PQ) is used in making the catalyst. The zeolite of Catalyst B was steamed before compositing in the mull to reduce alpha to the same level as the zeolite of Catalyst A. Physical and chemical properties of these catalysts are given in Table 4.

TABLE 4

| Properties of HDC Catalysts | | |
|---|---|---|
| | Catalyst A | Catalyst B |
| Zeolite UCS, Angstroms | 24.40 | 24.37 |
| Zeolite Size, um | ~1 | 0.2–0.4 |
| Particle Density, g/cc | 0.94 | 0.87 |
| Real Density, g/cc | 2.67 | 2.68 |
| Pore Volume, cc/g | 0.69 | 0.77 |
| Surface Area, m²/g | 399 | 359 |
| Crush, lb/in | 81 | 72 |
| Ni, wt % | 4.0 | 3.8 |
| W, wt % | 10.0 | 9.6 |

EXAMPLE 12

Catalysts A and B were crushed to 14/28 mesh size and loaded into a microreactor. These catalysts were sulfided with 2 wt % $H_2S$/98 wt % $H_2$. The feedstock was a hydrotreated VGO, whose properties are listed in Table 5. Reaction conditions included 1300 psig, 1 LHSV, and 5000 SCF/B $H_2$. Reactor temperature was adjusted to obtain 60% conversion to products boiling below 390° F. (200° C.).

TABLE 5

| Feedstock Properties | |
|---|---|
| API Gravity | 29.0 |
| Aniline, °F. | 104 |
| Nitrogen, ppm | 3 |
| Sulfur, ppm | 20 |
| Hydrogen, wt % | 12.25 |
| Distillation, °F. | (D2887) |
| IBP | 184 |
| 10% | 362 |
| 30% | 464 |
| 50% | 516 |
| 70% | 573 |
| 90% | 662 |
| FBP | 808 |

The results of this reaction are summarized in FIG. 15 which shows that the small crystal size USY (Catalyst B) was more active than the large crystal size USY (Catalyst A).

What is claimed is:

1. A catalyst comprising zeolite Y and a combination of hydrogenating metals, wherein said zeolite Y has a crystal size of from about 0.1 to about 0.5 microns.

2. A catalyst according to claim 1, wherein said combination of hydrogenating metals is selected from the group consisting of cobalt-molybdenum, nickel-molybdenum, nickel-tungsten and cobalt-nickel-tungsten.

3. A catalyst according to claim 1 comprising nickel and tungsten.

4. A catalyst according to claim 1, which is sulfided.

5. A catalyst according to claim 3 comprising 4.0 wt % nickel and 15.0 wt % tungsten.

6. A catalyst according to claim 3 comprising 3.8 wt % nickel and 9.6 wt % tungsten.

7. A catalyst according to claim 1, wherein said zeolite Y has a crystal size of 0.2–0.4 microns.

8. A catalyst according to claim 1, wherein said zeolite Y is a USY zeolite.

9. A catalyst according to claim 1, wherein said zeolite Y has a unit cell size of 24.50 Angstroms or less.

10. A catalyst according to claim 1, wherein said zeolite Y has a unit cell size of 24.20–24.40 Angstroms.

11. A catalyst according to claim 1, wherein said zeolite Y has a unit cell size of 24.37 Angstroms.

12. A catalyst according to claim 1, wherein nickel and tungsten are impregnated onto said catalyst.

13. A catalyst according to claim 1, wherein said zeolite Y is combined with a binder to form a bound zeolite Y, and wherein nickel and tungsten are impregnated onto said bound zeolite Y.

* * * * *